Figure 1:
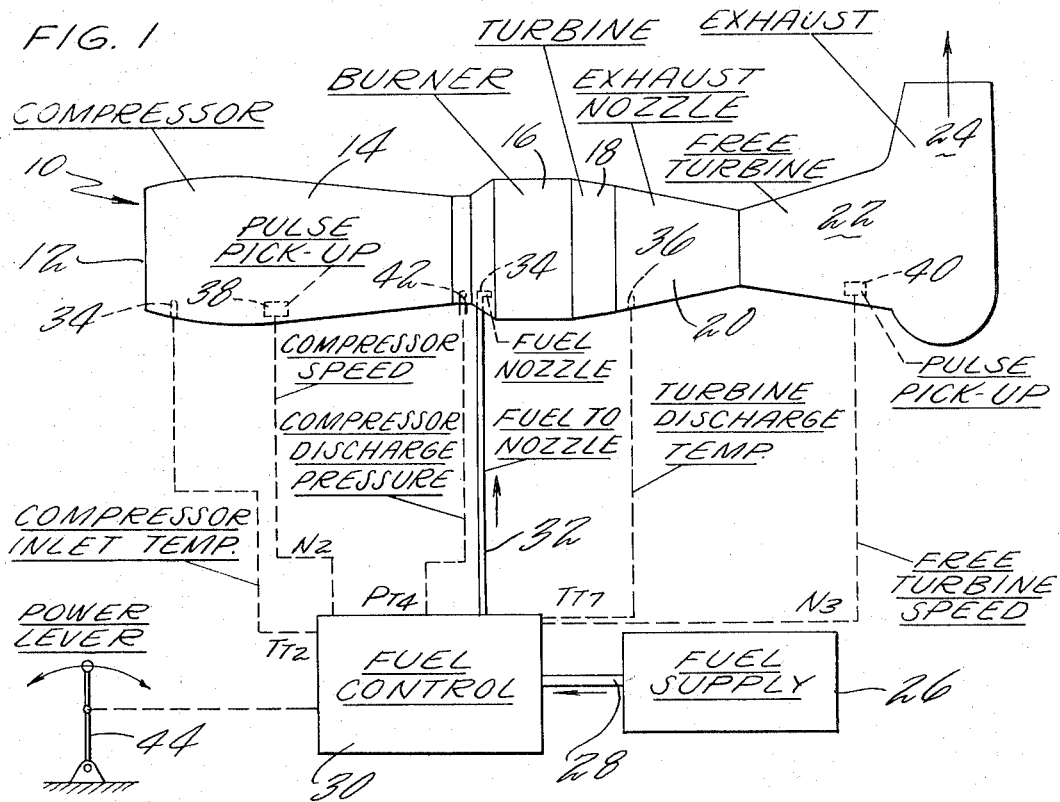

Jan. 3, 1967 F. J. BEATRICE ET AL 3,295,316
SPEED OVERSHOOT LIMITER FOR FUEL CONTROLS
Filed June 10, 1964 2 Sheets-Sheet 1

INVENTORS
FINTON J. BEATRICE
RICHARD A. ALLEN
BY Donald J. Bradley
ATTORNEY

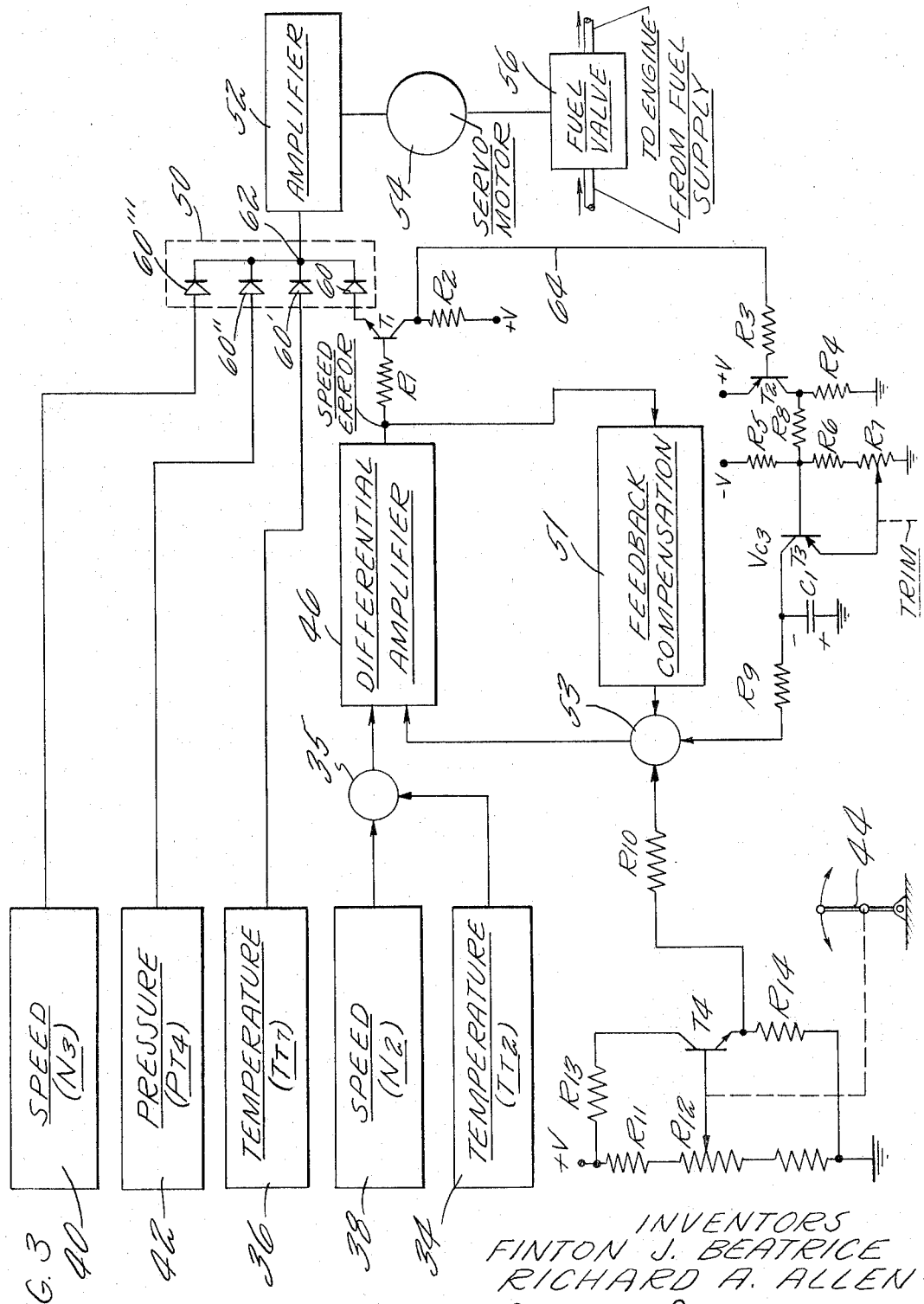

United States Patent Office 3,295,316
Patented Jan. 3, 1967

3,295,316
SPEED OVERSHOOT LIMITER FOR FUEL CONTROLS
Finton J. Beatrice, Broad Brook, and Richard A. Allen, Vernon, Conn., assignors to United Aircraft Corporation, East Hartford, Conn., a corporation of Delaware
Filed June 10, 1964, Ser. No. 373,942
8 Claims. (Cl. 60—39.28)

This invention relates to an electronic fuel control for gas turbine engines, and in particular to speed overshoot apparatus used in conjunction with a fuel control to reduce or limit the speed overshoot of a gas turbine engine when it is accelerated from one speed or power level to another level.

The power produced by a gas turbine engine, under standard operating conditions, is essentially proportional to the rotor speed of the engine. Thus, a command to go from one power level to another, such as advancement of the power lever by the operator or pilot, is really a command to increase the rotor speed of the engine. In a typical gas turbine fuel control, rotor speed is the controlling parameter, actual engine rotor speed being compared with desired engine rotor speed as indicated by a power lever setting, any difference therebetween being used to regulate the fuel flow to the engine. However, during periods of acceleration, as from idle speed to a higher power condition, it has been found desirable to schedule the fuel flow to the engine as a function of a parameter other than speed in order to avoid surge, stall or overtemperature of the engine. Parameters often used to control fuel flow during acceleration are compressor discharge pressure or tailpipe temperature. Once the engine has accelerated to the desired rotor speed as determined by the power lever setting, control of fuel flow to the engine is then returned to the rotor speed parameter. Ordinarily this technique results in a significant speed overshoot above the reference or commanded speed indicated by the power lever setting. This overshoot is undesirable not only because of the increase in fuel consumption involved, but also because of the higher temperatures and stresses which occur when the engine exceeds its maximum rated speed. Furthermore, where electronic fuel controls are used in conjunction with aircraft gas turbine powerplants, this overshoot reduces the control which the pilot has over the operation of the aircraft.

This invention eliminates the disadvantages of the prior art devices by preventing or limiting speed overshoot when a gas turbine engine is accelerated from one speed or power level to another. The apparatus of this invention monitors the parameters which control fuel flow at any given instant, and when an acceleration is sensed, a biasing signal is generated which is then subtracted from the desired reference rotor speed. This biasing signal may assume any desired value, but is typically equal to approximately 5% of the reference speed, i.e., the desired speed as determined by the power lever setting. Thus the reference speed signal fed to the fuel control will be typically approximately 95% of the true reference speed as set by the power lever. As the engine rotor speed builds up during the acceleration to the 95% value, control of fuel flow will be returned to the speed parameter. When this occurs, the 5% biasing signal which was subtracted from the true reference speed is gradually removed allowing the reference speed signal to increase gradually to the original 100% value. This lag or memory feature momentarily holds the value of the reference speed signal to approximately 95%, and then allows it to increase exponentially to 100% in a time dependent upon the particular time constant of the circuits and the actual value of the biasing signal. Thus, overshoot of the speed signal is prevented and the engine is controlled to the steady state speed reference.

It is therefore an object of this invention to provide a novel apparatus for use in an electronic fuel control for gas turbine engines which prevents speed overshoot of the engine when it is accelerated from one speed or power level to another.

Another object of this invention is to provide apparatus for use in a turbine fuel control which reduces the speed reference signal when the engine is accelerated.

A further object of this invention is a novel electronic circuit for use in turbine engine fuel controls which reduces the reference speed signal during acceleration and which gradually fades in the speed reference signal to 100% when the acceleration has been accomplished.

Another object of this invention is a novel trigger circuit having a fade-in capacitor for reducing the speed reference signal during acceleration of a gas turbine fuel control.

Figure 2:
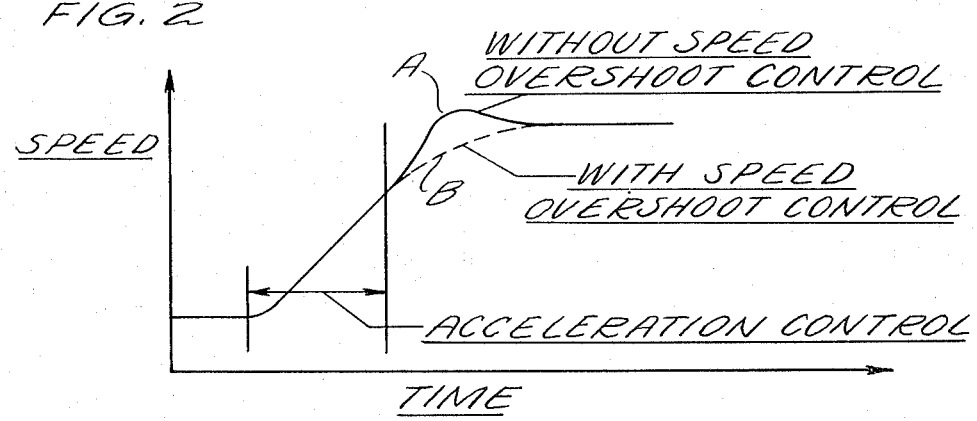

These and other objects and a fuller understanding of the invention may be had by referring to the following description and claims, read in conjunction with the accompanying drawings in which:

FIGURE 1 shows schematically a typical gas turbine engine with an associated fuel control; and FIGURE 2 shows graphically how speed overshoot is prevented when using this invention; and FIGURE 3 shows schematically a typical electronic fuel control utilizing this invention.

Referring now particularly to FIGURE 1, there is shown a gas turbine-type powerplant referred to generally as an engine, and a fuel control responsive to various engine parameters for regulating the flow of fuel from a fuel supply to the engine. The engine is generally indicated by numeral 10, and comprises an inlet section 12, a compressor section 14 containing either a single rotor or a dual rotor, a combustion or burner section 16, a turbine section 18 containing either a single or dual turbine, and a tailpipe section 20 containing an exhaust nozzle. The compressor section 14 is mechanically connected by one or two coaxial shafts to the turbine section 18. The products of combustion, due to the burning of fuel in burner section 16, propel the turbine or turbines in section 18. This in turn through the coaxial shafts drives the blades in compressor section 14. The gases emitted from the turbine are still at a high energy level and may be used for propelling an aircraft as in the typical jet engine, or may as further shown in FIGURE 1 be used for driving a free turbine 22 which may in turn be coupled to a pump, electrical generator, or other device to which it is desired to supply power. When a free turbine section 22 is coupled to the engine 10, the spent gases are discharged through an exhaust section 24.

Fuel is supplied to burner section 16 from a fuel supply 26 through a conduit 28 by way of a fuel control, shown generally as reference numeral 30. Fuel control 30 is responsive to varying engine parameters such as speed, temperature and pessure, and schedules the amount of fuel which flows through conduit 32 to fuel nozzle 34. Various sensors are positioned strategically within the engine 10 to respond to different engine parameters and feed corresponding signals into the fuel control 30. Those shown in FIGURE 1 are representative of typical electronic fuel control systems. Temperature is sensed at the compressor inlet by bulb 34, and at the discharge end of the turbine or in the tailpipe by bulb 36. Speed may be sensed by a pulse pickup 38 in the compressor section of the engine, or if a free turbine is coupled to the engine, by pulse pickup 40. Pressure may be sensed by sensor 42 at the discharge end of the compressor. A power lever 44 regulates the desired speed reference signal, the power lever being equivalent to the throttle in an aircraft. The turbine engine 10, the particular parameters sensed and the various sensors used to generate indications of the engine parameters are well known in the art and form no part of this invention.

FIGURE 3 shows schematically a typical fuel control which incorporates this invention. Speed sensors 38 and 40, temperature bulbs 34 and 36, and pressure sensor 42, referred to in FIGURE 1, produce signals indicative of their respective engine parameters. Although the invention is not limited thereto, the fuel control system shown in FIGURE 3 is one typical of the state of the art. In this control system, compressor rotor speed $N_2$ as modified by compressor inlet or ambient temperature $T_{t2}$, at junction 35, is the prime parameter to which fuel flow is regulated. The actual $N_2$ speed is compared with a speed reference signal determined by the position of power lever 44. Movement of power lever 44 varies the base voltage of transistor $T_4$ due to movement of the pick-off arm of potentiometer $R_{12}$ which is supplied with a positive voltage through resistor $R_{11}$. Positive voltage is also supplied to the collector of transistor $T_4$ through resistor $R_{13}$. Transistor $T_4$ is an emitter follower, the drop across resistor $R_{14}$ being fed through resistor $R_{10}$ to summing point 53 where it is combined with a feedback signal and a biasing signal as fully explained later. The error signal generated by the comparison between the speed reference signal and the actual speed signal is amplified by differential amplifier 46. The output of the differential amplifier, which is a signal indicative of speed error, is fed together with signals indicative of other perameters through a selection network generally represented by block 50 to a servo amplifier 52. Feedback compensation network 51 stabilizes the speed loop by feeding a signal proportional to rate of speed error back to summing point 53. Selector circuit 50 selects the parameter which will control the fuel to the engine by means of amplifier 52, servomotor 54 and the fuel valve 56. The selected control signal may be the free turbine speed $N_3$, turbine discharge temperature signal $T_{t7}$, compressor dicharge pressure $P_{t4}$ or compressor rotor speed error $N_2$. These selected control signals are coupled through the respective series diodes 60''', 60', 60'', and 60 to junction 62 at the input of amplifier 52. The diodes are poled in such manner that the most positive control signal will control the voltage at junction 62. The control voltages are designed to operate in such manner that the one calling for the least fuel will be the most positive.

During steady state operations the fuel flow is controlled by the compressor rotor speed $N_2$. Hence, the output from differential amplifier 46 will be a signal which is more positive than the $N_3$, $P_{t4}$ and $T_{t7}$ signals. Under this condition diode 60 is forward biased due to the speed error output signal feed from amplifier 46 through resistor $R_1$ to the base of transistor $T_1$, and both transistor $T_1$ and diode 60 will be conducting. Transistor $T_1$ acts as an emitter follower so that the voltage at junction 62 is essentially the same as the speed error signal. While not shown, circuitry is incorporated in the $N_3$, $P_{t4}$, and $T_{t7}$ circuits which will schedule the fuel flow if the free turbine speed, compressor discharge pressure or turbine discharge temperature approach critical values.

When transistor $T_1$ is conducting, i.e. when $N_2$ speed is in control of the fuel flow, a voltage drop occurs across resistor $R_2$ and the voltage at the collector junction of transistor $T_1$ is fed through resistor $R_3$ to the base junction of transistor $T_2$. This voltage being more negative than the emitter voltage of transistor $T_2$ produces conduction of transistor $T_2$ and current flow across resistor $R_4$. The collector junction of transistor $T_2$ reaches a positive value approximately equivalent to the emitter bias of transistor $T_2$. This voltage is fed through resistor $R_8$ to the base junction of transistor $T_3$. Transistor $T_3$ is a pnp transistor, and the positive voltage fed to the base of transistor $T_3$ will cause transistor $T_3$ to be turned off.

When $T_3$ is off for some length of time the capacitor $C_1$, and the resistor $R_9$ have no effect upon the speed reference signal and are considered to be out of the control loop. Only when $T_3$ conducts will $C_1$ and $R_9$ affect the speed reference signal.

When an acceleration occurs, produced by the operator advancing power lever 44, the speed error signal will move rapidly in a negative direction. As soon as the speed error voltage becomes more negative than any of the $N_3$, $P_{t4}$ or $T_{t7}$ signals, transistor $T_1$ will turn off and the next most positive control signal will control the voltage at junction 62. Normally temperature will take command of the fuel flow. At this time the collector junction of transistor $T_1$ will be equal to the collector bias voltage, and this positive voltage will be fed through resistor $R_3$ to the base of transistor $T_2$, turning transistor $T_2$ off. As this occurs, the voltage at the collector junction of transistor $T_2$ will drop towards the ground level, and the voltages on the emitter and base junctions of transistor $T_3$ will now be determined by the voltage drop across resistance dividers $R_5$, $R_6$ and $R_7$. Transistor $T_3$ will then conduct, and current will flow through transistor $T_3$ and resistors $R_9$ and $R_{10}$. As transistor $T_3$ saturates, the collector voltage will approach the negative voltage to which the emitter junction is biased. This will place a negative voltage across capacitor $C_1$ as shown.

The $N_2$ speed reference voltage from transistor $T_4$ is always positive, and the collector voltage, $V_{c3}$, of transistor $T_3$ being negative will subtract from the voltage fed from transistor $T_4$ into differential amplifier 46 in accordance with the voltage divider formed by resistors $R_9$ and $R_{10}$. The voltage subtracted will be in accordance with the relationship of $$\frac{R_9}{R_9+R_{10}}(V_{c3})$$

The resistances $R_9$ and $R_{10}$ are chosen such that the resultant voltage fed into differential amplifier 46 will be typically reduced by approximately 5% from the positive voltage generated by the $N_2$ speed reference circuit via transistor $T_4$.

As the increase in fuel flow to the engine causes $N_2$ speed to approach the $N_2$ reference speed as modified by the voltage on capacitor $C_1$, the speed error output from differential amplifier 46 will increase again in a positive direction and eventually assume control of the fuel flow and the selector circuit 50. Without this invention the typical compensation of the speed error path is of a lag-lead form. This provides high gain at very low frequencies to give high static accuracy of speed control, and lower gain at higher frequencies to keep system stability. Thus the speed error signal from the compensated amplifier lags the actual speed error. Therefore the actual speed would be above the reference speed before the output of the compensated amplifier indicates that the sense of the speed error has reversed. By incorporating this invention, this will occur when the $N_2$ speed reaches approximately 95% of the actual reference speed. Hence, at 95% of speed the increased positive output from differential amplifier 46 will again cause transistor $T_1$ to conduct, drop the collector voltage of transistor $T_1$, turn on transistor $T_2$ and turn off transistor $T_3$. With transistor $T_3$ turned off, capacitor $C_1$ will discharge through resistors $R_9$, $R_{10}$, and $R_{14}$ in a time determined by the RC time constant of the network. The $N_2$ speed reference signal fed into differential amplifier 46 from junction 53 will then increase gradually toward the 100% value. Speed reference signal $N_2$ will fade in gradually toward 100%, and the $N_2$ actual speed will respond by also gradually approaching 100%. Thus, overshoot of the $N_2$ speed above 100% has been prevented.

FIGURE 2 shows graphically the results of the invention. Line A shows the speed overshoot as a function of time without the speed overshoot control of this invention. Line B shows how the engine speed as a function of time approaches the 100% limit without overshoot by incorporating this invention.

This invention may be used in any control system for a rotating member in which overshoot is a problem. For example, in a pure speed control the concepts of this invention may be used to bias the speed reference downward any time the power lever is advanced. Nor is this invention limited to speed controls, since the inventive concepts as hereinafter claimed may be used in temperature, pressure or other controls.

The embodiment disclosed herein is only by way of example, since it will be obvious to those skilled in the art to modify the various circuits and the arrangement of parts to suit the particular application.

We claim:

1. In a control for a device having first and second variable parameters of operation, means for sensing the value of a first variable, means for establishing a reference value of said first variable, means for comparing the sensed value and the reference value of said first variable and producing a first control signal, means for producing a second control signal responsive to a second variable, means for conducting said first control signal to the device to change the value of said first variable, means responsive to an increase in said reference value for said first variable for disconnecting said first control signal from said device and for conducting said second control signal to said device, and means operative during the period when said second control signal is connected to said device for temporarily reducing the established reference value of said first variable.

2. In a combined acceleration and speed control of the automatically rebalancing type for a rotating member, means for producing a signal indicative of the actual speed of the rotating member, means for producing a signal indicative of the desired speed of said member, means for comparing said actual speed signal with said desired speed signal to produce a speed error signal, an electrically controlled speed adjusting device for said member responsive to said speed error signal for altering the speed of said member in such sense as to reduce said signal to zero, means responsive to a parameter of the rotating member other than speed for producing a second signal to actuate said speed adjusting device, means responsive to engine acceleration for connecting said second signal to said speed adjusting device and disconnecting said speed error signal, and means for temporarily reducing said desired speed signal when said speed error signal is disconnected from said speed adjusting device.

3. A fuel control system for a turbine engine comprising:
   a control valve for controlling the fuel supply to said engine,
   actuating means operable in response to a control signal to regulate said control valve,
   means for sensing a plurality of engine parameters and producing parameter signals indicative thereof,
   means for producing from said parameter signals a plurality of control signals,
   control means for selectively feeding at least one of said control signals to said actuating means,
   means for producing a reference signal for a selected one of said engine parameters,
   means for comparing said reference signal with the parameter signal of said selected engine parameter to produce an error signal,
   means for producing from said error signal an error control signal,
   means for feeding said error control signal to said control means whereby said error signal is driven to a minimum,
   means responsive to said error signal above a preselected value for producing a bias signal,
   means for subtracting said bias signal from said reference signal to thereby reduce said error signal,
   and means responsive to a reduction in said error signal below a preselected minimum for gradually reducing said bias signal.

4. A fuel control system for a turbine engine comprising:
   a control valve for controlling the fuel supply to said engine,
   actuating means operable in response to a control signal to regulate said control valve,
   means for sensing a plurality of engine parameters including speed and producing a plurality of engine parameter signals including a speed signal,
   means for producing a speed reference signal,
   means for producing from said speed signal and said speed reference signal a speed error signal,
   means for producing from said speed error signal and said other engine parameter signals a plurality of control signals including a speed control signal,
   control means for selectively feeding at least one of said control signals to said actuating means,
   means responsive to a speed error signal above a preselected value for producing a bias signal,
   means for subtracting said bias signal from said speed reference signal whereby said speed reference signal and said speed error signal are reduced,
   and means for gradually reducing said bias signal as said speed error signal is reduced.

5. A fuel control system as in claim 4 in which said bias signal is approximately 5% of the value of said speed reference signal.

6. A fuel control system as in claim 5 in which said bias signal is produced when the selected control signal fed to said actuating means is other than the said speed control signal, and in which said bias signal is gradually reduced when the selected control signal fed to said actuating means is said speed control signal.

7. A fuel control system as in claim 6 and including
   a first transistor connected to said control means for producing a bias control signal when the control signal fed to said actuating means is other than said speed control signal,
   and a second transistor connected to said first transistor and rendered conductive in response to said bias control signal, said second transistor generating a bias signal when it is rendered conductive.

8. A fuel control system as in claim 7 and including a capacitor and voltage divider connected to said second transistor,
   and means connecting said capacitor and said voltage divider circuit to said speed reference signal producing means,
   said capacitor being charged upon conduction of said second transistor and being discharged through said voltage divider when said second transistor is rendered nonconductive.

References Cited by the Examiner

UNITED STATES PATENTS

| 2,662,372 | 12/1953 | Offner | 60—39.28 |
| 2,697,908 | 12/1954 | Offner | 60—39.28 |
| 2,971,338 | 2/1961 | Bodemuller | 60—39.28 |
| 3,082,954 | 3/1963 | Offner | 60—39.28 X |
| 3,203,179 | 8/1965 | Blackaby | 60—39.28 |

JULIUS E. WEST, *Primary Examiner.*